(12) United States Patent
Nordmo

(10) Patent No.: US 12,491,974 B2
(45) Date of Patent: Dec. 9, 2025

(54) SAFETY DEVICE FOR SECURING A THREADED CONNECTION BETWEEN A GAS CYLINDER AND AN ACTUATOR OF AN INFLATABLE LIFE VEST, A SAFETY ARRANGEMENT, A LIFE VEST ASSEMBLY, AND USE OF SUCH DEVICE, ARRANGEMENT AND ASSEMBLY

(71) Applicant: Safe Inflator AS, Kristiansand (NO)

(72) Inventor: Jon Nordmo, Kristiansand (NO)

(73) Assignee: Safe Inflator AS, Kristiansand (NO)

( * ) Notice: Subject to any disclaimer, the term of this patent is extended or adjusted under 35 U.S.C. 154(b) by 619 days.

(21) Appl. No.: 17/791,241

(22) PCT Filed: Jan. 22, 2021

(86) PCT No.: PCT/NO2021/050016
§ 371 (c)(1),
(2) Date: Jul. 7, 2022

(87) PCT Pub. No.: WO2021/150123
PCT Pub. Date: Jul. 29, 2021

(65) Prior Publication Data
US 2023/0348030 A1  Nov. 2, 2023

(30) Foreign Application Priority Data
Jan. 24, 2020  (NO) .................................. 20200091

(51) Int. Cl.
*B63C 9/18* (2006.01)
*B63C 9/00* (2006.01)
*B63C 9/125* (2006.01)

(52) U.S. Cl.
CPC .................. *B63C 9/18* (2013.01); *B63C 9/00* (2013.01); *B63C 9/1255* (2013.01)

(58) Field of Classification Search
CPC ............ B63C 9/00; B63C 9/1255; B63C 9/18
(Continued)

(56) References Cited

U.S. PATENT DOCUMENTS 3,426,942 A * 2/1969 Friedman .................. F42C 3/00
441/94
4,260,075 A * 4/1981 Mackal ..................... B63C 9/18
441/95
(Continued)

FOREIGN PATENT DOCUMENTS

AU   2012261490   12/2012
EP    3157807     4/2017
(Continued)

OTHER PUBLICATIONS

Norwegian Search Report for NO 20200091, dated Aug. 25, 2020.
International Search Report and the Written Opinion for PCT/NO2021/050016, dated Apr. 12, 2021.

*Primary Examiner* — Lars A Olson
(74) *Attorney, Agent, or Firm* — Andrus Intellectual Property Law, LLP

(57) ABSTRACT

A safety device is for securing a threaded connection between a gas cylinder and an actuator of an inflatable life vest, where the gas cylinder has an elongated cylindrical outer surface in respect to its longitudinal axis and a threaded end portion configured to be connected to a corresponding threading of said actuator, and the safety device has a capsule body forming an internal compartment configured to receive the gas cylinder, wherein the internal compartment has a form conforming to the outer cylindrical surface of the gas cylinder with a clearance between the capsule body and the outer cylindrical surface of the gas cylinder. The capsule body is configured to revolve around (Continued)

the longitudinal axis of the gas cylinder when the gas cylinder is connected to the actuator.

20 Claims, 3 Drawing Sheets

(58) Field of Classification Search
USPC .......................................................... 441/90
See application file for complete search history.

(56) References Cited

U.S. PATENT DOCUMENTS

| | | | |
|---|---|---|---|
| 7,128,629 B2 * | 10/2006 | Summers | B63C 9/08 |
| | | | 441/81 |
| 9,499,244 B2 * | 11/2016 | Best | B63C 9/18 |
| 2011/0000550 A1 | 1/2011 | Rogier et al. | |
| 2012/0073466 A1 | 3/2012 | Wang | |
| 2020/0001954 A1 | 1/2020 | Best et al. | |

FOREIGN PATENT DOCUMENTS

| | | |
|---|---|---|
| GB | 2029951 | 3/1980 |
| KR | 102001776 | 7/2019 |

* cited by examiner

SAFETY DEVICE FOR SECURING A THREADED CONNECTION BETWEEN A GAS CYLINDER AND AN ACTUATOR OF AN INFLATABLE LIFE VEST, A SAFETY ARRANGEMENT, A LIFE VEST ASSEMBLY, AND USE OF SUCH DEVICE, ARRANGEMENT AND ASSEMBLY

CROSS-REFERENCE TO RELATED APPLICATIONS

This application is the U.S. national stage application of International Application PCT/NO2021/050016, filed Jan. 22, 2021, which international application was published on Jul. 29, 2021, as International Publication WO 2021/150123 in the English language. The International Application claims priority of Norwegian patent application Ser. No. 20/200,091, filed Jan. 24, 2020. The international application and Norwegian application are both incorporated herein by reference, in entirety.

INTRODUCTION

The present invention relates to a safety device for securing a threaded connection between a gas cylinder and an actuator of an inflatable life vest. The gas cylinder comprises an elongated cylindrical outer surface in respect to its longitudinal axis, a tapered end portion and a threaded portion at the tapered portion. The threaded portion is configured to be connected to said actuator.

The present invention further relates to a safety arrangement for an inflatable life vest, a life vest assembly and respective use of the safety device, the safety arrangement and the life vest assembly.

PRIOR ART

A passenger aircraft is, as a standard, provided with a life vest for each passenger. These life vests are placed under each passenger's seat. Each life vest is provided with at least one gas cylinder. The life vest is inflated with gas from the gas cylinder by pulling a releasing cord. The releasing cord activates a releaser of the actuator, such as by means of puncturing the gas cylinder. The actuator is connected to the interior of the inflatable vest.

Airport authorities and airlines spend substantial efforts on security checks of passengers prior to boarding an aircraft. Liquids are only allowed in small quantities. The passengers are not allowed to bring with them weapons or potential weapons such as pointed items.

It is known that compressed gas may be used as a propellant in weapons, such as an air gun. Primitive air gun like weapons may be constructed where a known gas cylinder is used as a source for compressed air. Such primitive weapons may be assembled on board an airplane from parts that by themselves do not look like a weapon. The gas cylinder in a life vest may complete the weapon. Accordingly, it is important to prevent unauthorized removal of the gas cylinder from the inflatable life vest.

Patent document AU 2012261490 discloses an automatic inflator for inflating articles such as life rafts and life vests. The inflator is provided with a status indicator showing that an unspent gas cylinder has been installed, and that the inflator is fully operational or partially inoperable. Patent document US 2011000550 also discloses an inflator with a status indicator. Patent document US 2012073466 discloses an auto/manual gas inflator. A first indication mechanism and a second indication mechanism indicate the status of the gas inflator.

SUMMARY OF THE INVENTION

The invention has for its object to further increase safety on board an airplane by eliminating the risk that a gas cylinder is used as part of a weapon. In particular, the object of the invention is to provide a safety device that prevents unauthorized removal of the gas cylinder from the inflatable life vest.

These objects are achieved by means of safety device for securing a threaded connection between a gas cylinder and an actuator of an inflatable life vest, where the gas cylinder comprises an elongated cylindrical outer surface in respect to its longitudinal axis and a threaded end portion configured to be connected to a corresponding threading at an inlet of the actuator.

The safety device comprises a capsule body forming an internal compartment configured to receive the gas cylinder. The internal compartment has a form conforming to the outer surface of the gas cylinder with a clearance between the capsule body and the outer surface of the gas cylinder. The capsule body is configured to be a revolving capsule body around the longitudinal axis of the gas cylinder when the gas cylinder is connected to the actuator. In some embodiments the capsule body turns readily around the gas cylinder. In one embodiment the capsule body is restricted from making a full 360 degree turn around the gas cylinder.

The internal compartment is formed to enclose the outer surface of the gas cylinder so that a user is prevented from grasping the outer surface of the gas cylinder when the gas cylinder is connected to the actuator. Furthermore, the internal compartment is formed to accommodate the outer surface of the gas cylinder with a clearance. An annulus is thereby formed between the outer surface of the gas cylinder and an internal surface of the capsule body. There is no restriction in the clearance or annulus that prevents a revolving motion of the capsule body. The gas cylinder is formed with a tapered end portion. The internal compartment is formed with a tapered portion which surrounds the tapered end portion of the gas cylinder. Thereby the capsule body cannot be pulled off the gas cylinder in the direction of the longitudinal axis when the gas cylinder the gas cylinder is connected to the actuator.

The capsule body prevents the user from grasping the outer surface of the gas cylinder. The user can only grasp the revolving capsule body which turns readily without interaction with the gas cylinder when the gas cylinder is connected to the actuator. Accordingly, the safety device of the invention assures that the threaded connection between the gas cylinder and the actuator of the inflatable life vest is maintained when the the gas cylinder is connected to the actuator.

The capsule body comprises a structural material that prevents the user from breaking open the internal compartment without tools. For example, the capsule body mainly comprises a structural polymeric material, such as polyethylene, polypropylene, polybutylene, polystyrene, polymethylpentene and polyvinyl chloride. According to an embodiment of the invention, the capsule body forms the internal compartment with a smooth surface facing the outer surface of the gas cylinder, thereby enabling the capsule body to revolve in respect to the gas cylinder with small interaction between the capsule body and the gas cylinder.

According to an embodiment of the invention, the clearance between the capsule body and the outer surface of the gas cylinder is in the interval 0.1-5 mm, preferably 0.5-1.5 mm.

According to an embodiment of the invention, the capsule body comprises a first body portion comprising at least one first connection member and a second body portion comprising at least one second connection member configured to form a connection with the at least one first connection member. The first body portion and the second body portion together form the compartment by arranging the first body portion to the second body portion around the outer surface of the gas cylinder and connecting the first body portion to the second body portion by means of the first connection member and the second connection member.

By providing the capsule body in the form of the first body portion and the second body portion, and with the first connection member and the second connection member, the introduction of the gas cylinder into the internal compartment is facilitated.

According to an embodiment of the invention, the first body portion spans a first portion of the circumference of the gas cylinder, and the second body portion spans a second portion of the circumference of the gas cylinder such that the first portion and the second portion together make a full circumference. The first portion of the circumference may be half the circumference. The first body portion and the second body portion are configured to be arranged and connected around the outer surface of the gas cylinder when the gas cylinder is connected to the actuator. By means of the first body portion and the second body portion, the internal compartment is easily and quickly established by joining the first body portion and the second body portion together at the outer surface of the gas cylinder.

According to an embodiment of the invention, the first body portion is configured as an open pipe having a first end opening and a second end opening, wherein the first end opening is configured to receive the gas cylinder for establishing the threaded connection at the second end opening between the gas cylinder and the actuator, wherein the second body portion is formed as an end plug configured to be inserted into the first end opening for connecting the first body portion to the second body portion by means of the first connection member and the second connection member.

By configuring the first body portion as an open pipe, insertion of the gas cylinder into the first end opening and establishment of threaded connection is done in a first step followed by a second step of plugging the first end portion by means of the second body portion.

According to an embodiment of the invention, the safety device comprises a stop member configured to protrude from the capsule body toward the actuator. The stop member protrudes over a portion of the actuator when the gas cylinder is connected to the actuator.

By configuring the stop member to protrude over a portion of the actuator, the capsule body cannot turn readily 360° around the gas cylinder as the stop member engages and stops when turned into contact with the life vest. I.e., the turning of the capsule body is restricted to less than a full turn. The stop member has the advantage of preventing full rotation of the capsule body and provides a further prevention of any attempts to disconnect, the threaded connection between the gas cylinder and the actuator in case the clearance between the capsule body and the outer surface of the gas cylinder is somehow tampered with.

According to an embodiment of the invention, the safety device comprises one or more rotational bearings at said clearance for facilitating turning the capsule body around the gas cylinder when the gas cylinder is connected to the actuator. The rotational bearings are for example ball bearings arranged in the clearance.

The above objects to increase safety on board an airplane and to prevent unauthorized removal of the gas cylinder from the inflatable life vest, are further obtained by means of a safety arrangement for an inflatable life vest, wherein the safety arrangement comprises the safety device according to any of the above embodiments, a gas cylinder, and an actuator.

According to an embodiment of the invention, the gas cylinder is arranged within the internal compartment of the capsule body and the actuator is in threaded connection with the gas cylinder.

The above object s to increase safety on board an airplane and to prevent unauthorized removal of the gas cylinder from the inflatable life vest, are further obtained by means of a life vest assembly comprising an inflatable life vest and a safety arrangement according to any of the above embodiments, which safety arrangement is connected to the life vest.

The above object s to increase safety on board an airplane and to prevent unauthorized removal of the gas cylinder from the inflatable life vest, are further obtained by means of use of a safety device according to any of the above embodiments, use of a safety arrangement according to any of the above embodiments, and use of a life vest assembly according to the above embodiment.

BRIEF DESCRIPTION OF DRAWINGS

In the following is described examples of preferred embodiments illustrated in the accompanying drawings, wherein.

DETAILED DESCRIPTION OF THE INVENTION

Figure 1A:
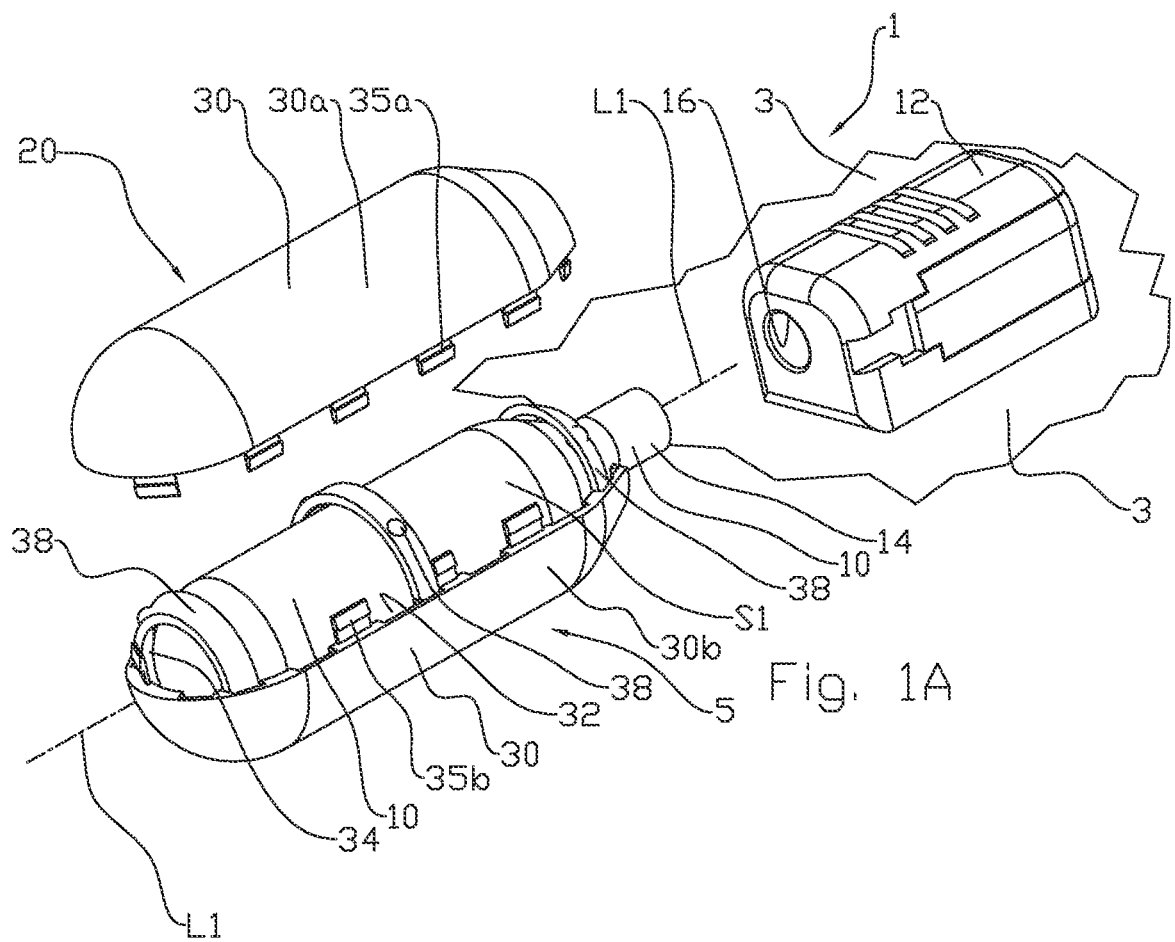
FIGS. 1A-B disclose a life vest assembly comprising a life vest and a safety arrangement according to a first embodiment of the invention.

In FIG. 1A is an embodiment of a life vest assembly 1 disclosed in an exploded view. The life vest assembly 1 comprises an inflatable life vest 3 and a safety arrangement 5. The safety arrangement 5 comprises a gas cylinder 10 for inflating the life vest 3 and an actuator 12 for controlling the inflation of the life vest 3. The gas cylinder 10 comprises an elongated rotational symmetric cylindrical outer surface S1 in respect to its longitudinal axis L1. The gas cylinder 10 comprises a tapered end portion at an external threaded end portion 14. The external threaded end portion 14 is configured to be connected to a corresponding internal threading 16 of the actuator 12.

The safety arrangement 5 further comprises a safety device 20 for securing a threaded connection between the gas cylinder 10 and the actuator 12. The threaded connection comprises engagement between the threaded end portion 14 of the gas cylinder 10 and the corresponding threading 16 of the actuator 12.

Figure 1B:
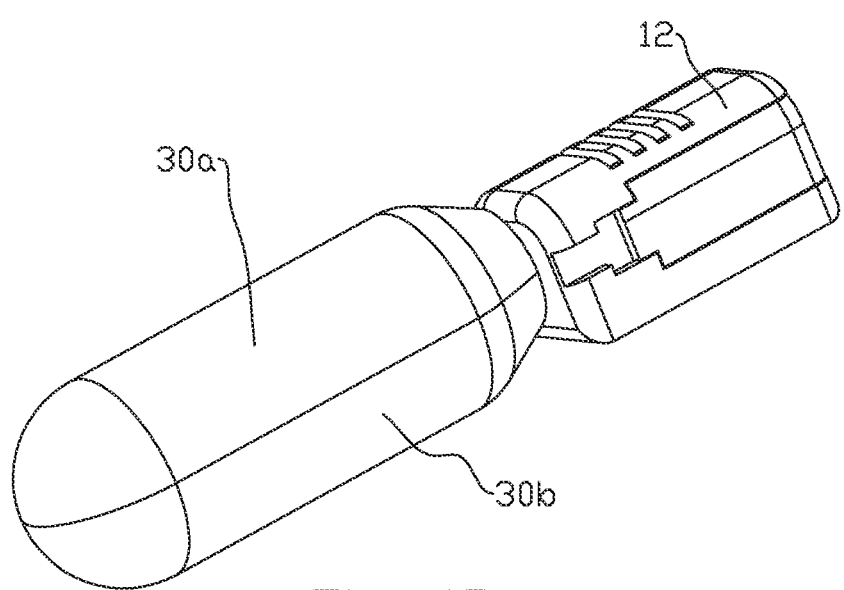

A first embodiment of the safety device 20 is disclosed in FIGS. 1A-B. The safety device 20 comprises a capsule body 30 forming an internal compartment 32 configured to receive the gas cylinder 10. The internal compartment 32 has a form conforming to the outer surface S1 of the gas cylinder 10 including the tapered end portion of the gas cylinder 10.

The internal compartment 32 is formed to accommodate the gas cylinder 10 when the gas cylinder 10 is connected to the actuator 12, thereby preventing a user from grasping the outer surface S1 of the gas cylinder 10. The internal compartment 32 is further formed with a clearance 34 that enables the capsule body 30 to revolve around the longitudinal axis L1 of gas cylinder 10 when the gas cylinder 10 is connected to the actuator 12. Accordingly, the safety device 20 prevents the user from disconnecting the threaded connection between the gas cylinder 10 and the actuator 12 as the user is prevented from grasping directly the outer surface S1 of the gas cylinder 10, the user cannot pull the capsule body 30 off the gas cylinder 10, and the clearance enables the capsule body 30 to revolve around a longitudinal axis L1 of the gas cylinder 10.

The capsule body 30 comprises a first body portion 30a comprising at least one first connection member 35a and a second body portion 30b comprising at least one second connection member 35b configured to form a connection with the at least one first connection member 35a. The first body portion 30a and the second body portion 30b together form the internal compartment 32 by arrangement of the first body portion 30a to the second body portion 30b around the outer surface S1 of the gas cylinder 10. The first body portion 30a is connected to the second body portion 30b by means of the first connection member 35a and the second connection member 35b. The connected first body portion 30a and the second body portion 30b are shown in FIG. 1B.

In the embodiment in FIG. 1A, the first body portion 30a spans a first portion of the circumference of the gas cylinder 10. The second body portion 30b spans a second portion of the circumference of the gas cylinder 10 such that the first portion and the second portion together make a full circumference. The first portion of the circumference may be half the circumference. The first body portion 30a and the second body portion 30b are configured to be connected along the longitudinal axis L1 of the gas cylinder 10. The embodiment shown in FIGS. 1A-B has the advantage of enabling the internal compartment 32 to be quickly and easily established when the gas cylinder 10 is connected to the actuator 12.

In the disclosed embodiment of the invention, the safety device 20 comprises one or more rotational bearings 38 at the clearance for facilitating turning the capsule body 30 around the gas cylinder 10 when the gas cylinder 10 is already connected to the actuator 12. The one or more rotational bearings 38 are for example ball bearings.

Figure 2A:
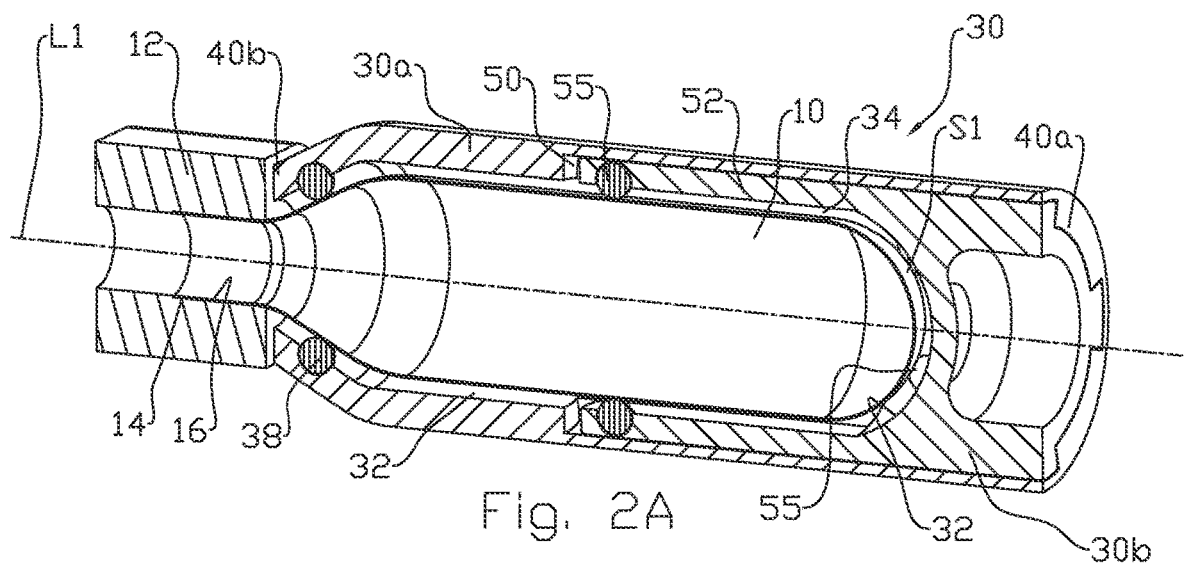
FIGS. 2A-C disclose the safety arrangement according to a second embodiment of the invention.
Figure 2B:
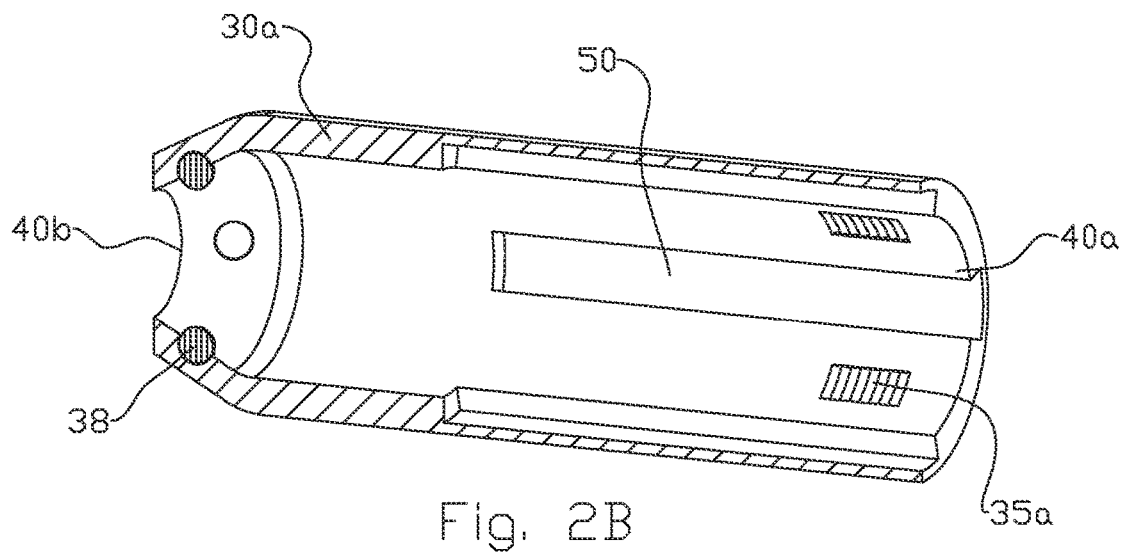
Figure 2C:
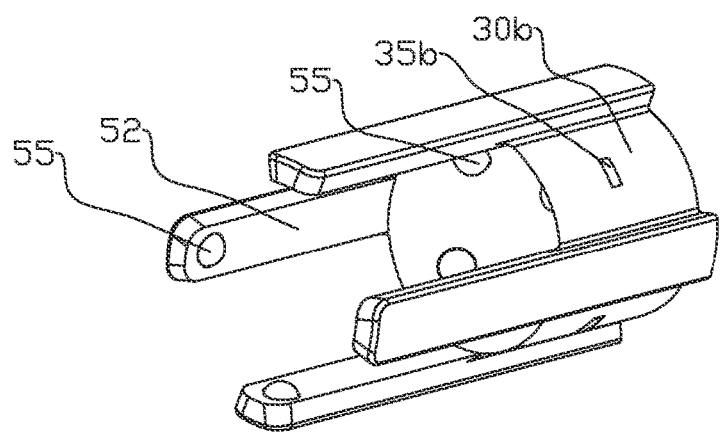

A second embodiment of the safety arrangement 5 disclosed in FIGS. 2A-C. The first body portion 30a is configured as an open pipe having a first end opening 40a and a second end opening 40b. The gas cylinder 10 is configured to be inserted into the first end opening 40a and brought to the tapered second end opening 40b for establishing the threaded connection at the second end opening 40b between gas cylinder 10 and the actuator 12.

The second body portion 30b is formed as an end plug configured to be inserted into the first end opening 40a for connecting the second body portion 30b to the first body portion 30a by means of the first connection member 35a and the second connection member 35b. In the disclosed embodiment, the first connection member 35a comprises recesses within a hollow space of the first body portion 30a and the second connection member 35b comprises a protrusion on the second body portion 30b configured to engage with the recesses, see FIGS. 2A-2C.

In the disclosed embodiment in FIG. 2A-C, the first body portion 30a further comprises channels 50 extending along the hollow space and the second body portion 30b comprises corresponding arms 52 configured to be guided by the channels 50 when the second body portion 30b is inserted in the first body portion 30a. In the disclosed embodiment, the arms are provided with rotatable balls 55 to facilitate revolving of the capsule body 30 around the gas cylinder 10 when the gas cylinder 10 is connected to the actuator 12. The configuration of the first body portion 30a and the second body portion 30b with channels 50 and arms 52 facilitate the connection of the second body portion 30b with the first body portion 30a.

In the disclosed embodiment, the first body portion 30a is provided with rotational bearings 38 in form of rotatable balls at the second end opening 40b. The rotational bearings 38 facilitate revolving the capsule body 30 around the longitudinal axis L1 of the gas cylinder 10.

Figure 3A:
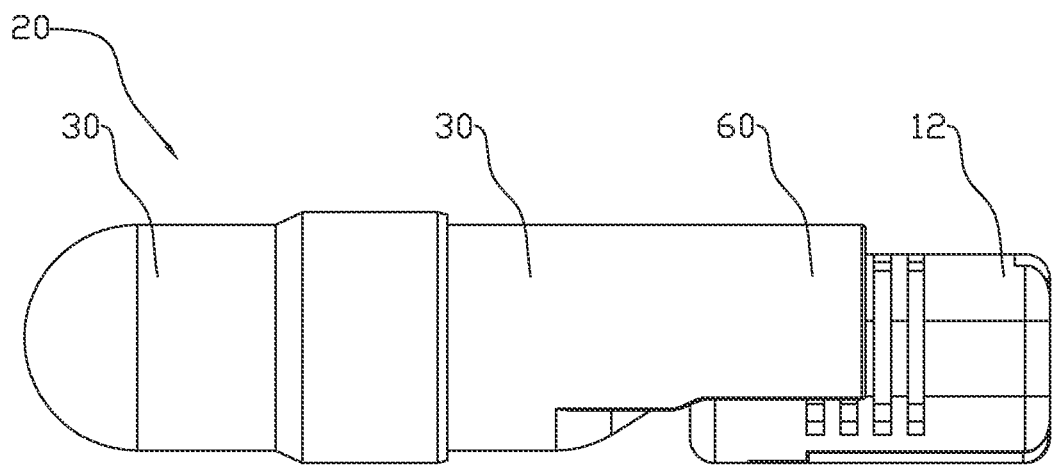
FIGS. 3A-B disclose the safety arrangement according to a third embodiment of the invention.
Figure 3B:
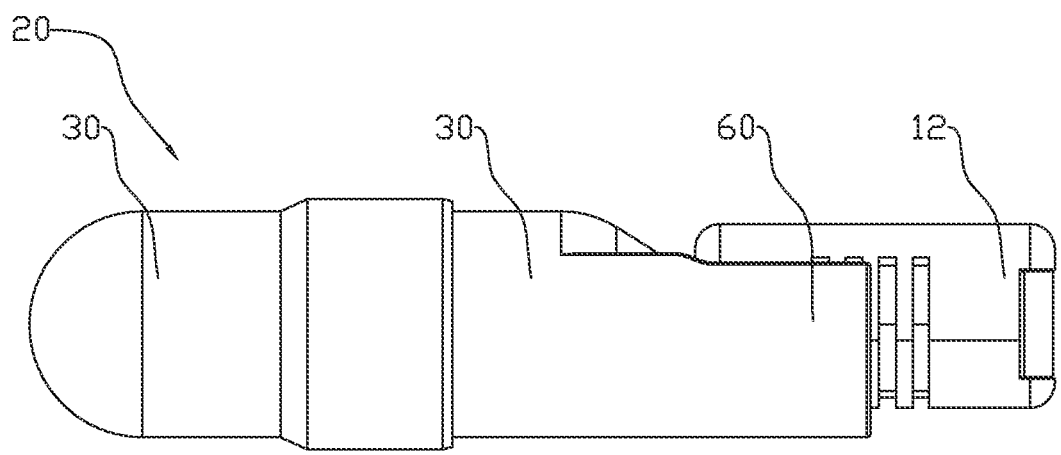

A third embodiment of the safety arrangement 5 disclosed in FIGS. 3A-B. The third embodiment differs from the embodiments shown in FIGS. 1 and 2A-C in that the safety device 20 comprises a stop member 60 in form of an arm protruding from the capsule body 30 toward the actuator 12. When the security device 20 is assembled and the gas cylinder 10 is connected to the actuator 12, the stop member 60 extends over a portion of the actuator 12.

The stop member 60 has the function of restricting the possible revolving of the capsule body 30 around the longitudinal axis L1 of gas cylinder 10 when the gas cylinder 10 is connected to the actuator 12. The revolving of the capsule body 30 is restricted to less than a full turn in that the stop member 60 is configured to engage with and be stopped by the life vest 3. Accordingly, the stop member 60 has the advantage of preventing full rotation of the capsule body 30 and thereby further prevents unauthorized removal of the gas cylinder 10 from the inflatable life vest 3.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A safety device for securing a threaded connection between a gas cylinder and an actuator of an inflatable life vest, where the gas cylinder comprises an elongated cylindrical outer surface in respect to its longitudinal axis and a threaded end portion configured to be connected to a corresponding threading of said actuator, and the safety device comprises a capsule body forming an internal compartment configured to receive the gas cylinder, wherein the internal compartment has a form conforming to the outer surface of the gas cylinder with a clearance between the capsule body and the outer surface of the gas cylinder, wherein the capsule body is configured to revolve around the longitudinal axis of the gas cylinder when the gas cylinder is connected to the actuator, wherein the capsule body comprises a first body portion comprising at least one first connection member and a second body portion comprising at least one second connection member configured to form a connection with the at least one first connection member, wherein the first body portion and the second body portion are configured to together form the internal compartment by arranging the first body portion to the second body portion around the outer surface of the gas cylinder and connecting the first body portion to the second body portion by means of the first connection member and the second connection member, and wherein the first body portion spans a first portion of the circumference of the gas cylinder and the second body portion spans a second portion of the circumference of the gas cylinder such that the first portion and the second portion together make a full circumference, wherein the first body portion and the second body portion are configured to be arranged and connected around the outer surface of the gas cylinder when the gas cylinder is connected to the actuator.

2. A safety device for securing a threaded connection between a gas cylinder and an actuator of an inflatable life vest, where the gas cylinder comprises an elongated cylindrical outer surface in respect to its longitudinal axis and a threaded end portion configured to be connected to a corresponding threading of said actuator, and the safety device comprises a capsule body forming an internal compartment configured to receive the gas cylinder, wherein the internal compartment has a form conforming to the outer surface of the gas cylinder with a clearance between the capsule body and the outer surface of the gas cylinder, wherein the capsule body is configured to revolve around the longitudinal axis of the gas cylinder when the gas cylinder is connected to the actuator, wherein the capsule body comprises a first body portion comprising at least one first connection member and a second body portion comprising at least one second connection member configured to form a connection with the at least one first connection member, wherein the first body portion and the second body portion are configured to together form the internal compartment by arranging the first body portion to the second body portion around the outer surface of the gas cylinder and connecting the first body portion to the second body portion by means of the first connection member and the second connection member, and wherein the first body portion is configured as an open pipe having a first end opening and a tapered second end opening, wherein the first end opening is configured to receive the gas cylinder for establishing the threaded connection at the second end opening between gas cylinder and the actuator, where in the second body portion is formed as an end plug configured to be inserted into the first end opening for connecting the first body portion to the second body portion via the first connection member and the second connection member.

3. A safety device for securing a threaded connection between a gas cylinder and an actuator of an inflatable life vest, where the gas cylinder comprises an elongated cylindrical outer surface in respect to its longitudinal axis and a threaded end portion configured to be connected to a corresponding threading of said actuator, and the safety device comprises a capsule body forming an internal compartment configured to receive the gas cylinder, wherein the internal compartment has a form conforming to the outer surface of the gas cylinder with a clearance between the capsule body and the outer surface of the gas cylinder, wherein the capsule body is configured to revolve around the longitudinal axis of the gas cylinder when the gas cylinder is connected to the actuator, wherein the safety device comprises a stop member configured to protrude from the capsule body toward the actuator, and the stop member protrudes over a portion of the actuator when the gas cylinder is connected to the actuator.

4. A safety device for securing a threaded connection between a gas cylinder and an actuator of an inflatable life vest, where the gas cylinder comprises an elongated cylindrical outer surface in respect to its longitudinal axis and a threaded end portion configured to be connected to a corresponding threading of said actuator, and the safety device comprises a capsule body forming an internal compartment configured to receive the gas cylinder, wherein the internal compartment has a form conforming to the outer surface of the gas cylinder with a clearance between the capsule body and the outer surface of the gas cylinder, wherein the capsule body is configured to revolve around the longitudinal axis of the gas cylinder when the gas cylinder is connected to the actuator, wherein the safety device comprises one or more rotational bearings at said clearance for facilitating turning the capsule body around the gas cylinder when the gas cylinder is connected to the actuator.

5. The safety device according to claim 3, wherein the capsule body comprises a first body portion comprising at least one first connection member and a second body portion comprising at least one second connection member configured to form a connection with the at least one first connection member, wherein the first body portion and the second body portion are configured to together form the internal compartment by arranging the first body portion to the second body portion around the outer surface of the gas cylinder and connecting the first body portion to the second body portion by means of the first connection member and the second connection member.

6. The safety device according to claim 3, wherein the internal compartment is formed with a tapered portion surrounding a tapered end portion of the gas cylinder.

7. A safety arrangement for an inflatable life vest, wherein the safety arrangement comprises the safety device according to claim 3, a gas cylinder and an actuator.

8. The safety arrangement according to claim 7, wherein the gas cylinder is arranged within the internal compartment of the capsule body and the actuator is in threaded connection with the gas cylinder.

9. A life vest assembly comprising an inflatable life vest and a safety arrangement according to claim 7, connected to the life vest.

10. A safety arrangement for an inflatable life vest, wherein the safety arrangement comprises the safety device according to claim 2, a gas cylinder and an actuator.

11. The safety arrangement according to claim 10, wherein the gas cylinder is arranged within the internal compartment of the capsule body and the actuator is in threaded connection with the gas cylinder.

12. A life vest assembly comprising an inflatable life vest and a safety arrangement according to claim 10, connected to the life vest.

13. A safety arrangement for an inflatable life vest, wherein the safety arrangement comprises the safety device according to claim 3, a gas cylinder and an actuator.

14. The safety arrangement according to claim 13, wherein the gas cylinder is arranged within the internal compartment of the capsule body and the actuator is in threaded connection with the gas cylinder.

15. A life vest assembly comprising an inflatable life vest and a safety arrangement according to claim 13, connected to the life vest.

16. A safety arrangement for an inflatable life vest, wherein the safety arrangement comprises the safety device according to claim 4, a gas cylinder and an actuator.

17. The safety arrangement according to claim 16, wherein the gas cylinder is arranged within the internal compartment of the capsule body and the actuator is in threaded connection with the gas cylinder.

18. A life vest assembly comprising an inflatable life vest and a safety arrangement according to claim 16, connected to the life vest.

19. The safety device according to claim 4, wherein the capsule body comprises a first body portion comprising at least one first connection member and a second body portion comprising at least one second connection member configured to form a connection with the at least one first connection member, wherein the first body portion and the second body portion are configured to together form the internal compartment by arranging the first body portion to the second body portion around the outer surface of the gas cylinder and connecting the first body portion to the second body portion by means of the first connection member and the second connection member.

20. The safety device according to claim 4, wherein the internal compartment is formed with a tapered portion surrounding a tapered end portion of the gas cylinder.

\* \* \* \* \*